US012776037B2

(12) United States Patent
Kim et al.

(10) Patent No.: US 12,776,037 B2
(45) Date of Patent: Oct. 27, 2026

(54) METHOD AND ELECTRONIC DEVICE FOR GENERATING REPRESENTATIVE FRAME IMAGE OF MEDICAL IMAGE

(71) Applicant: Medipixel, Inc., Seoul (KR)

(72) Inventors: Hyun-Woo Kim, Seoul (KR); Soon Cheol Noh, Seoul (KR); Yeong Heon Mok, Seoul (KR)

(73) Assignee: Medipixel, Inc., Seoul (KR)

( * ) Notice: Subject to any disclaimer, the term of this patent is extended or adjusted under 35 U.S.C. 154(b) by 0 days.

(21) Appl. No.: 19/007,672

(22) Filed: Jan. 2, 2025

(65) Prior Publication Data

US 2025/0217979 A1 Jul. 3, 2025

(30) Foreign Application Priority Data

Jan. 2, 2024 (KR) ........................ 10-2024-0000552

(51) Int. Cl.
*G06T 7/00* (2017.01)

(52) U.S. Cl.
CPC .. *G06T 7/0012* (2013.01); *G06T 2207/30101* (2013.01)

(58) Field of Classification Search
CPC .................... G06T 7/0012; G06T 2207/30101
See application file for complete search history.

(56) References Cited

U.S. PATENT DOCUMENTS 9,521,988 B2 * 12/2016 Zhang .................... G16H 50/30
2010/0034441 A1 * 2/2010 Makram-Ebeid ...... A61B 6/481 382/128
2013/0272596 A1 * 10/2013 Xu ........................ G06V 10/426 382/134
2021/0042927 A1 2/2021 Amis et al.
2021/0193299 A1 6/2021 Satoh et al.
2022/0015730 A1 1/2022 Haase et al.
2023/0298180 A1 * 9/2023 Kweon .................. A61B 6/481 382/128
2023/0351649 A1 11/2023 Wang

FOREIGN PATENT DOCUMENTS

CN 113096061 B 9/2023
EP 3659505 A1 6/2020
JP 2021062065 A 4/2021
JP 2022510879 A 1/2022

OTHER PUBLICATIONS

Kulathilake et al., "Region Growing Segmentation Method for Extracting Vessel Structures from Coronary Cine-angiograms", downloaded on Jan. 29, 2024, pp. 142-147.
Tamim et al., "Retinal Blood Vessel Segmentation Using Hybrid Features and Multi-Layer Perceptron Neural Networks", Faculty of Computers and Information, Suez Canal University, Ismailia 41522, Egypt; www.mdpi.com/ journal/ symmetry, pp. 1-27.
May 27, 2025 (EP) Communication with European Search Report, App EP24223842, 7 pages.

* cited by examiner

*Primary Examiner* — Andrew W Bee
*Assistant Examiner* — D J Dhooge
(74) *Attorney, Agent, or Firm* — Banner & Witcoff, Ltd.

(57) ABSTRACT

A method of generating a representative frame image of a medical image performed by at least one processor is disclosed, the method comprising: acquiring a medical image including blood vessels; calculating scores for each of a plurality of frame images included in the medical image; and generating a representative frame image of the medical image from the plurality of frame images based on the scores for each of the plurality of frame images.

19 Claims, 9 Drawing Sheets

METHOD AND ELECTRONIC DEVICE FOR GENERATING REPRESENTATIVE FRAME IMAGE OF MEDICAL IMAGE

CROSS-REFERENCE TO RELATED APPLICATION

This application claims priority to Korean Patent Application No. 10-2024-0000552, filed in the Korean Intellectual Property Office on Jan. 2, 2024, the entire contents of which are hereby incorporated by reference.

BACKGROUND

Field

The present disclosure relates to a method and an electronic device for generating representative frame images of medical images.

Description of Related Art

In medical fields, medical images obtained using X-ray, Computed Tomography (CT) scans, angiography, and similar methods may be analyzed to diagnose lesions of a subject under examination (e.g., a patient). Conventionally, diagnostic experts (e.g., medical professionals) have primarily analyzed medical images directly to diagnose lesions. However, in recent years, methods that utilize machine learning models to automatically analyze medical images have been employed, and technology development in this area is actively ongoing.

Meanwhile, existing methods for analyzing medical images using machine learning models may include selecting the most suitable frame image from the medical images (e.g., a frame image where the target vessel and its surroundings are most distinctly distinguishable) and analyzing the selected frame image (e.g., vessel classification). However, in the frame image selection step from the medical image, if a frame image unsuitable for image analysis is selected, the subsequent step of analyzing the frame image may produce incorrect results. Accordingly, in methods for automatically analyzing medical images, there is a need for developing technologies to generate frame images that can represent medical images.

SUMMARY

The present disclosure provides a method and an electronic device for generating representative frame images of medical images to address the above-described issues.

The present disclosure may be implemented in various forms, including methods, devices (systems), and/or computer programs stored on computer-readable storage media.

According to one embodiment of the present disclosure, a method of generating representative frame images of medical images, performed by at least one processor, may include obtaining a medical image capturing a blood vessel, calculating scores for each of a plurality of frame images included in the medical image, and generating a representative frame image of the medical image from the plurality of frame images based on the scores for each of the plurality of frame images.

According to one embodiment, the step of calculating scores for each of the plurality of frame images may include obtaining a score vector composed of n score elements from n frame images through a machine learning model, wherein the medical image includes n frame images, and n is a positive integer.

According to one embodiment, the step of obtaining the score vector may include calculating n score elements corresponding to each of the n frame images based on at least one of a value measuring the similarity between each of the n frame images and other frame images or a value measuring the image quality of each of the n frame images.

According to one embodiment, the step of obtaining the score vector may include identifying a region corresponding to a blood vessel in each of the n frame images, identifying a region among the regions corresponding to the blood vessel that satisfies a specified condition, and calculating n score elements corresponding to each of the n frame images based on the size of the region satisfying the specified condition.

According to one embodiment, the specified condition may include a condition where the intensity of the color of pixels included in the region is equal to or greater than a specified threshold.

According to one embodiment, the step of generating a representative frame image of the medical image may include obtaining a weight vector composed of n weight elements from the score vector using a specified mathematical formula.

According to one embodiment, the step of generating a representative frame image of the medical image may include applying a corresponding weight element among n weight elements included in the weight vector to each of the n frame images, and merging the n frame images, to which the corresponding weight elements have been applied, to generate the representative frame image.

According to one embodiment, the step of applying weight elements corresponding to each of the n frame images may include applying weight elements corresponding to each of the pixels included in each of the n frame images.

According to one embodiment of the present disclosure, a computer program stored in a computer-readable recording medium may be provided to execute the aforementioned method of generating representative frame images of medical images on a computer.

According to one embodiment of the present disclosure, an electronic device may include a memory and at least one processor connected to the memory and configured to execute at least one computer-readable program contained in the memory. The at least one program may include instructions for obtaining a medical image capturing a blood vessel, calculating scores for each of a plurality of frame images included in the medical image, and generating a representative frame image of the medical image from the plurality of frame images based on the scores for each of the plurality of frame images.

According to some embodiments of the present disclosure, by generating a representative frame image of the medical image from the plurality of frame images based on the scores for each of the plurality of frame images included in the medical image, a frame image suitable for analysis may be utilized in the process of analyzing the medical image, thereby increasing the reliability of medical image analysis.

The effects of the present disclosure are not limited to those mentioned above, and other effects not explicitly stated may be clearly understood by those skilled in the art to which the present disclosure pertains ("those skilled in the art") from the description of the claims.

BRIEF DESCRIPTION OF THE DRAWINGS

Embodiments of the present disclosure will be described with reference to the accompanying drawings explained below, where similar reference numbers indicate similar elements; however, the embodiments are not limited thereto.

DETAILED DESCRIPTION

Figure 1:
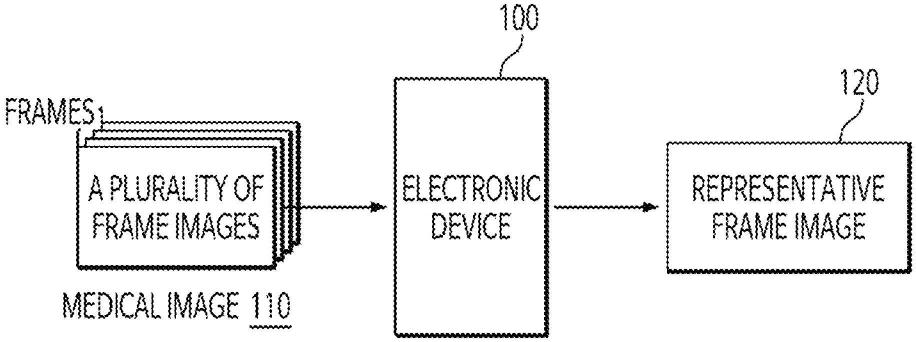
FIG. 1 is a diagram illustrating an electronic device for generating representative frame images of medical images according to an embodiment of the present disclosure.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Accordingly, the terms used in this disclosure should be defined based on the meaning of the term and the overall content of the present disclosure, rather than simply the name of the term.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as circuit and circuitry may refer to circuits in hardware, but may also refer to circuits in software. The "processor" should be interpreted broadly to encompass a general-purpose processor, a central processing unit (CPU), a microprocessor, a digital signal processor (DSP), a neural processing unit (NPU), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory.

The memory integrated with the processor is in electronic communication with the processor.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

Hereinafter, various examples of the present disclosure will be described in detail with reference to the accompanying drawings.

FIG. 1 is a diagram illustrating an electronic device 100 for generating a representative frame image 120 of a medical image 110 according to an embodiment of the present disclosure. Referring to FIG. 1, the electronic device 100 may generate or provide the representative frame image 120 of the medical image 110 based on the medical image 110. For example, the electronic device 100 may receive the medical image 110 and generate the representative frame image 120 using a plurality of frame images included in the received medical image 110. Here, the medical image 110 refers to an image (e.g., video or still image) captured for the diagnosis, treatment, or prevention of diseases and may refer to images capturing the interior or exterior of a patient's body. For example, the medical image 110 may include images of all types (modalities), such as X-ray images, ultrasound images, chest radiographs, Computed Tomography (CT) images, Positron Emission Tomography (PET) images, Magnetic Resonance Imaging (MRI) images, Sonography (Ultrasound US) images, functional Magnetic Resonance Imaging (fMRI) images, digital pathology Whole Slide Images (WSI), and Digital Breast Tomosynthesis (DBT) images. According to one embodiment, the medical image 110 may include a medical image capturing the blood vessels of a target patient in a state where a contrast agent has been administered to the patient. In addition, the frame image may refer to a still image constituting the medical image 110. For example, the fact that the medical image 110 includes a plurality of frame images may mean that the medical image 110 consists of a plurality of still images. In this case, the plurality of frame images may be sequentially assigned frame numbers (e.g., the first frame image, the second frame image, . . . , the n-th frame image, where n is a natural number) based on the time at which the medical image 110 was captured.

Although FIG. 1 does not depict a storage system communicable with the electronic device 100, the electronic device 100 may be configured to connect to or communicate with one or more storage systems. A storage system connected to or configured to communicate with the electronic device 100 may include a device or cloud system that stores and manages various data associated with the task of generating the representative frame image 120 of the medical image 110. For efficient data management, the storage system may utilize a database to store and manage various data. Here, the various data may include any data associated with the generation of the representative frame image 120. For example, the various data may include machine learning models, training data, and medical images 110 related to the generation of the representative frame image 120, but is not limited thereto.

The electronic device 100 may obtain a medical image 110 capturing a blood vessel. This medical image 110 may be received through a communicable storage medium (e.g., a hospital system, local/cloud storage system, etc.). Additionally, the electronic device 100 may calculate scores for each of a plurality of frame images included in the medical image 110. Here, the score for a frame image may represent an evaluation score indicating how suitable the corresponding frame image in the medical image 110 is for analysis related to the diagnosis, treatment, or prevention of diseases. The method of calculating scores for frame images will be described in detail with reference to FIGS. 3 and 4. Subsequently, the electronic device 100 may generate a representative frame image 120 of the medical image 110 from the plurality of frame images based on the scores for each of the plurality of frame images. In this way, the electronic device 100 does not merely select one of the plurality of frame images included in the medical image 110 but generates the representative frame image 120 using the plurality of frame images included in the medical image 110. This supports the use of a frame image suitable for image analysis in the process of analyzing the medical image 110, thereby increasing the reliability of medical image 110 analysis.

Figure 2:
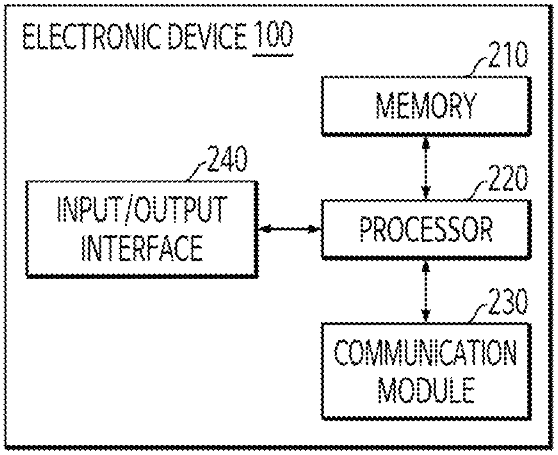
FIG. 2 is a diagram for explaining the configuration of an electronic device according to an embodiment of the present disclosure.

FIG. 2 is a diagram for explaining the configuration of the electronic device 100 according to an embodiment of the present disclosure. Referring to FIG. 2, the electronic device 100 may include a memory 210, a processor 220, a communication module 230, and an input/output interface 240. However, the configuration of the electronic device 100 is not limited thereto. According to various embodiments, the electronic device 100 may omit at least one of the above-described components and may further include at least one other component. For example, the electronic device 100 may further include a display. In this case, the electronic device 100 may display at least one of a medical image capturing a blood vessel (e.g., the medical image 110 of FIG. 1) or a representative frame image of the medical image (e.g., the representative frame image 120 of FIG. 1) on the display.

The memory 210 may store various data used by at least one other component of the electronic device 100 (e.g., the processor 220). The data may include, for example, software (or programs) and input or output data related to the commands associated therewith.

The memory 210 may include any non-transitory computer-readable recording medium. According to one embodiment, the memory 210 may include non-volatile mass storage devices, such as disk drives, solid-state drives (SSD), and flash memory. As another example, non-volatile mass storage devices such as ROM, SSD, flash memory, and disk drives may be included in the electronic device 100 as separate permanent storage devices distinct from the memory 210. Additionally, the memory 210 may store an operating system and at least one program code (e.g., instructions for generating representative frame images executed by the electronic device 100). In FIG. 2, the memory 210 is depicted as a single memory for simplicity; however, this is merely for convenience of explanation, and the memory 210 may include multiple memories and/or buffer memories.

The software components may be loaded from a computer-readable recording medium separate from the memory 210. Such separate computer-readable recording media may include recording media directly connectable to the electronic device 100, such as floppy drives, disks, tapes, DVD/CD-ROM drives, and memory cards. As another example, software components may be loaded into the memory 210 via the communication module 230 rather than a computer-readable recording medium. For example, at least one program may be loaded into the memory 210 based on a computer program installed via files provided through the communication module 230 by a file distribution system used by developers or for distributing installation files of applications (e.g., programs for tasks such as transmitting data, including medical images capturing blood vessels).

The processor 220 may execute software (or programs) to control at least one other component of the electronic device 100 connected to the processor 220 (e.g., hardware or software components) and perform various data processing or computations. According to one embodiment, as part of the data processing or computations, the processor 220 may load commands or data received from other components (e.g., the communication module 230) into volatile memory, process the commands or data stored in the volatile memory, and store the resulting data in non-volatile memory.

The processor 220 may be configured to process instructions of a computer program by performing basic arithmetic, logic, and input/output operations. The instructions may be provided to the electronic device 100 or other external systems via the memory 210 or the communication module 230. For example, the processor 220 may generate representative frame images of medical images. Subsequently, the processor 220 may store the generated representative frame image in the memory 210, display it on the display of the electronic device 100, or transmit it to an external electronic device via the communication module 230. Additionally, the processor 220 may perform additional analysis operations, such as classifying blood vessels using the representative frame image of the medical image. In FIG. 2, the processor 220 is depicted as a single processor for simplicity; however, this is merely for convenience of explanation, and the processor 220 may include a plurality of processors.

The communication module 230 may support the establishment of direct (e.g., wired) communication channels or wireless communication channels between the electronic device 100 and external electronic devices, as well as communication through the established communication channels. For example, the communication module 230 may provide configurations or functionalities for the electronic device 100 and external electronic devices (e.g., user terminals or cloud servers) to communicate with each other via a network. As one example, control signals, commands, or data provided under the control of the processor 220 of the electronic device 100 may be transmitted to an external electronic device via the communication module 230, a network, and the communication module of the external electronic device. For instance, the electronic device 100 may receive medical images capturing the blood vessels of a subject under examination via the communication module 230 from an external electronic device.

The input/output interface 240 may serve as a means for interfacing with input or output devices (not shown) connected to or included in the electronic device 100. For example, the input/output interface 240 may include at least one of a PCI express interface and an Ethernet interface. In FIG. 2, the input/output interface 240 is depicted as a component separate from the processor 220; however, it is not limited to this configuration and may be configured to be included in the processor 220.

According to one embodiment, the processor 220 may perform functions related to generating a representative frame image of a medical image. The processor 220 may execute at least one computer-readable program included in the memory 210 to perform functions related to generating the representative frame image of the medical image. Here, the at least one program may include instructions for obtaining a medical image capturing a blood vessel, calculating scores for each of a plurality of frame images included in the medical image, and generating a representative frame image of the medical image from the plurality of frame images based on the scores for each of the plurality of frame image. For convenience of explanation, the following description may refer to the processor 220 executing at least one program to perform functions related to generating a representative frame image of the medical image as the processor 220 performing functions related to generating the representative frame image of the medical image. For example, the inclusion of instructions related to generating a representative frame image of the medical image in the at least one program may correspond to a description that the processor 220 performs functions related to generating the representative frame image of the medical image.

According to one embodiment, the processor 220 may calculate scores for each of a plurality of frame images included in a medical image through a machine learning model that takes the medical image as input. Here, the score for a frame image may represent an evaluation score indicating how suitable the corresponding frame image in the medical image is for analysis related to the diagnosis, treatment, or prevention of diseases. Additionally, the machine learning model may include any model used to infer answers for given inputs. According to one embodiment, the machine learning model may include an artificial neural network model including an input layer, a plurality of hidden layers, and an output layer. Here, each layer may include one or more nodes. Furthermore, the machine learning model may include weights associated with a plurality of nodes included in the machine learning model. Here, the weights may include any parameters associated with the machine learning model. The machine learning model of the present disclosure may be a model trained using various learning methods. For example, various learning methods such as supervised learning, semi-supervised learning, unsupervised learning (or self-learning), and reinforcement learning may be utilized in the present disclosure. In the present disclosure, the machine learning model may refer to an artificial neural network model, and the artificial neural network model may refer to the machine learning model. Details regarding the artificial neural network model will be described with reference to FIG. 7.

Figure 3:
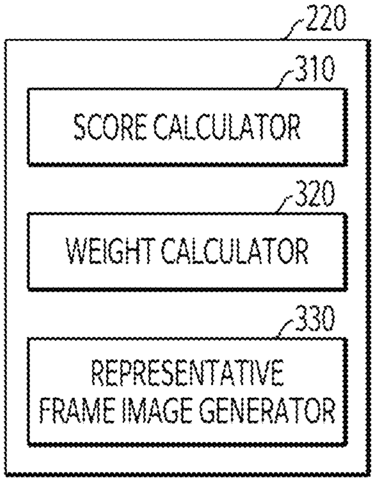
FIG. 3 is a diagram for explaining the configuration of a processor of the electronic device according to an embodiment of the present disclosure.

FIG. 3 is a diagram for explaining the configuration of the processor 220 of the electronic device according to an embodiment of the present disclosure. Referring to FIG. 3, the processor 220 may generate a representative frame image of a medical image (e.g., the medical image 110 in FIG. 1) (e.g., the representative frame image 120 in FIG. 1). To achieve this, the processor 220 may include a score calculator 310, a weight calculator 320, and a representative frame image generator 330. However, the types of components included in the processor 220 are categorized based on functions related to generating the representative frame image of the medical image, and the types and numbers of components are not limited to these. Additionally, at least one of the components included in the processor 220 may be implemented in the form of instructions stored in memory, such as the memory 210 shown in FIG. 2.

The processor 220 may acquire a medical image. According to one embodiment, the processor 220 may acquire a medical image capturing the blood vessels of a target patient in a state where a contrast agent has been administered to the patient. Here, the medical image may include a plurality of frame images, and the plurality of frame images may have an order based on the capture time. Such a medical image may be received from storage systems connected to or communicable with the electronic device (e.g., hospital systems, electronic medical records, prescription transmission systems, medical imaging systems, laboratory information systems, local/cloud storage systems), internal memory, and/or user terminals. The received medical image may be provided to the score calculator 310, the weight calculator 320, and/or the representative frame image generator 330 for use in generating the representative frame image of the medical image.

The score calculator 310 may calculate scores for each of a plurality of frame images included in the medical image. Here, the score for a frame image in the medical image may represent an evaluation score indicating how suitable the corresponding frame image is for analysis related to the diagnosis, treatment, or prevention of diseases.

According to one embodiment, the score for a frame image may be calculated based on a value measuring the similarity between the corresponding frame image and other frame images. For example, a frame image with a high similarity to other frame images may be assigned a high score. Assigning a high score to a frame image based on its similarity may indicate that the corresponding frame image is sufficiently similar to other frame images in the sequence of frame images, allowing the medical image to be analyzable by viewing only the corresponding frame image. The similarity between frame images may be calculated based on the similarity between the pixels included in each frame image. The similarity between pixels may be calculated using at least one of the color values or luminance values of the pixels.

According to one embodiment, the score for a frame image may be calculated based on a value measuring the image quality of the corresponding frame image. For example, a frame image with high image quality may be assigned a high score. Assigning a high score to a frame image based on image quality may indicate that the corresponding frame image is sharp and contains objects and/or backgrounds with relatively little motion compared to adjacent frame images, making it more advantageous for image analysis. The image quality of such a frame image may be calculated based on factors such as sharpness, brightness distortion, and contrast distortion. Sharpness, for example, indicates that an image has less blur; the sharper the image, the greater the change near edges, while a more blurred image exhibits less change near edges. Brightness distortion refers, for example, to a condition where the brightness of an image is excessively skewed to one extreme (e.g., too dark or too bright). By setting a threshold (or range) to account for such extreme conditions, brightness distortion may be recognized when the average brightness value of all pixels in the image exceeds the threshold (or falls outside the range). In this case, the lower the degree of brightness distortion, the higher the image quality may be evaluated. Contrast refers to the difference between dark and bright areas in an image. Accurate contrast may provide visually sharper images. Accordingly, contrast distortion, for example, refers to cases where the contrast of the image is distorted. The lower the degree of contrast distortion, the higher the image quality may be evaluated. Contrast distortion may be calculated based on factors such as the relative brightness ratio of dark and bright areas in the image.

According to one embodiment, the score for a frame image may be calculated based on a value measuring the similarity between the corresponding frame image and other frame images, as well as a value measuring the image quality of the corresponding frame image. For example, the score for a frame image may be determined as a combination of the value measuring the similarity between the corresponding frame image and other frame images and the value measuring the image quality of the corresponding frame image. In this case, the same or different weights may be applied to the value measuring the similarity between the corresponding frame image and other frame images and the value measuring the image quality of the corresponding frame image.

According to one embodiment, considering that the frame image is included in a medical image capturing a blood vessel, the score for the frame image may be calculated based on the size of a region in the image that satisfies specified conditions within the blood vessel region (or the region corresponding to the blood vessel). For example, a medical image capturing a blood vessel may be taken in a state where a contrast agent has been administered to the body of the target patient, allowing the target blood vessel to be distinctly distinguishable from its surroundings. Such a contrast agent may significantly enhance the contrast of the image by artificially increasing the difference in X-ray absorption. For instance, the blood vessel region filled with the contrast agent may appear darker (or blacker) than the surroundings. Accordingly, the region in the blood vessel that satisfies the specified conditions may refer to a region where the intensity of the color of pixels included in that region exceeds a specified threshold. The larger the size of the region in the blood vessel that satisfies the specified conditions, the higher the score for the frame image may be calculated. That is, assigning a high score to a frame image in relation to the blood vessel region means that the frame image was obtained when the target blood vessel was evenly and sufficiently filled with the contrast agent, indicating that the target blood vessel may be clearly distinguished from the surrounding areas in the frame image.

According to one embodiment, the score calculator 310 may calculate scores for each of a plurality of frame images included in the medical image using a machine learning model that takes the medical image as input. For example, the score calculator 310 may use the machine learning model to obtain scores for each of the plurality of frame images included in the medical image based on at least one of the similarity between the corresponding frame image and other frame images or the image quality of the corresponding frame image. As another example, the score calculator 310 may obtain scores for each of the plurality of frame images included in the medical image through a machine learning model, based on the size of the region within the blood vessel region in the image that satisfies a specified condition.

According to one embodiment, the score calculator 310 may use a machine learning model to mask regions determined to be blood vessels (blood vessel regions) in each of a plurality of frame images included in the medical image and calculate scores for each of the plurality of frame images included in the medical image based on the masked regions. At this time, the score for a frame image may include a score based on the intensity of the contrast agent calculable from the frame image. Here, the intensity of the contrast agent calculable from the frame image may include a value reflecting the degree to which the region corresponding to the blood vessel with the contrast agent injected is distinguishable from other regions in the frame image.

More specifically, the score calculator 310 may first input each of the plurality of frame images into the machine learning model to obtain a plurality of frame images where regions determined to be blood vessels are masked. At this time, the machine learning model may include a model trained to perform masking on regions determined to be blood vessels in the input image and output the masked image. For example, the machine learning model may be a supervised learning model trained using training data consisting of pairs of a plurality of training images and images where regions corresponding to blood vessels (e.g., regions where the contrast agent is injected) in each training image are masked (ground truth labels). However, this is not limited to supervised learning. Additionally, to distinguish regions determined to be blood vessels in the input image, a machine learning model based on semantic segmentation may be used. However, this is not limited to semantic segmentation models, and any type of machine learning model may be used. Next, the score calculator 310 may calculate scores for each of the plurality of frame images based on the plurality of masked frame images. For example, the score calculator 310 may calculate scores for each of the plurality of frame images based on the number of pixels in the masked regions in each of the plurality of masked frame images.

According to one embodiment, the score calculator 310 may calculate a reliability value for each of the plurality of pixels included in each of the plurality of frame images in the medical image, indicating whether each pixel is determined to belong to a blood vessel region, and based on the calculated reliability values, calculate a score for each of the plurality of frame images included in the medical image. For example, the score calculator 310 may use a filter to obtain reliability values indicating whether each of the plurality of pixels in a frame image is determined to belong to a blood vessel region. Here, the filter may output reliability values for each of the plurality of pixels in the input image, indicating whether the pixel corresponds to a vessel-like or tube-like structure. The filter may include, for example, a Frangi Filter, but is not limited thereto. Subsequently, the score calculator 310 may scale the reliability values calculated for the entire medical image. For instance, the score calculator 310 may adjust the reliability values to fall within a range of 0 to 1. Then, the score calculator 310 may sum the reliability values for each of the plurality of pixels determined to belong to a blood vessel region for each frame image and calculate a score for each frame image based on the summed value.

The method of calculating scores for frame images described above is merely an example, and the scope of the present disclosure is not limited thereto. Accordingly, various methods not described in this disclosure, such as score calculation methods using various filters, kernels, or models, may be applied to the present disclosure.

The weight calculator 320 may obtain or calculate weights for each of the plurality of frame images included in the medical image based on the scores for each frame image. For example, the weight calculator 320 may calculate weights for each of the plurality of frame images included in the medical image by applying the scores to a specified mathematical formula. According to one embodiment, the specified mathematical formula may include functions such as a softmax function or a min-max normalization function, or a combination of two or more functions. Using the min-max normalization function, the highest score may be set to 1 and the lowest score to 0, normalizing the scores to values between 0 and 1. Weights may then be calculated by multiplying the normalized values by a specific value or raising the normalized values to the power of n (where n is an integer greater than or equal to 2). For example, when the normalized value is raised to the power of n, for scores normalized to values between 0 and 1, weights close to 0 may be calculated for lower scores, while only the highest score may retain a weight of 1.

The representative frame image generator 330 may generate a representative frame image of the medical image from the plurality of frame images based on the scores for each of the plurality of frame images. According to one embodiment, the representative frame image generator 330 may apply weights corresponding to each of the plurality of frame images included in the medical image and merge the plurality of weighted frame images to generate the representative frame image. For example, the representative frame image generator 330 may generate the representative frame image by performing a weighted summation of the plurality of frame images and their corresponding weights. Here, applying weights to a frame image may mean applying weights to each of the pixels included in the frame image.

According to one embodiment, the representative frame image generator 330 may normalize the generated representative frame image. For example, the representative frame image generator 330 may normalize the representative frame image generated through weighted summation so that it has pixel values suitable for a model (e.g., a blood vessel classification model).

Figure 4:
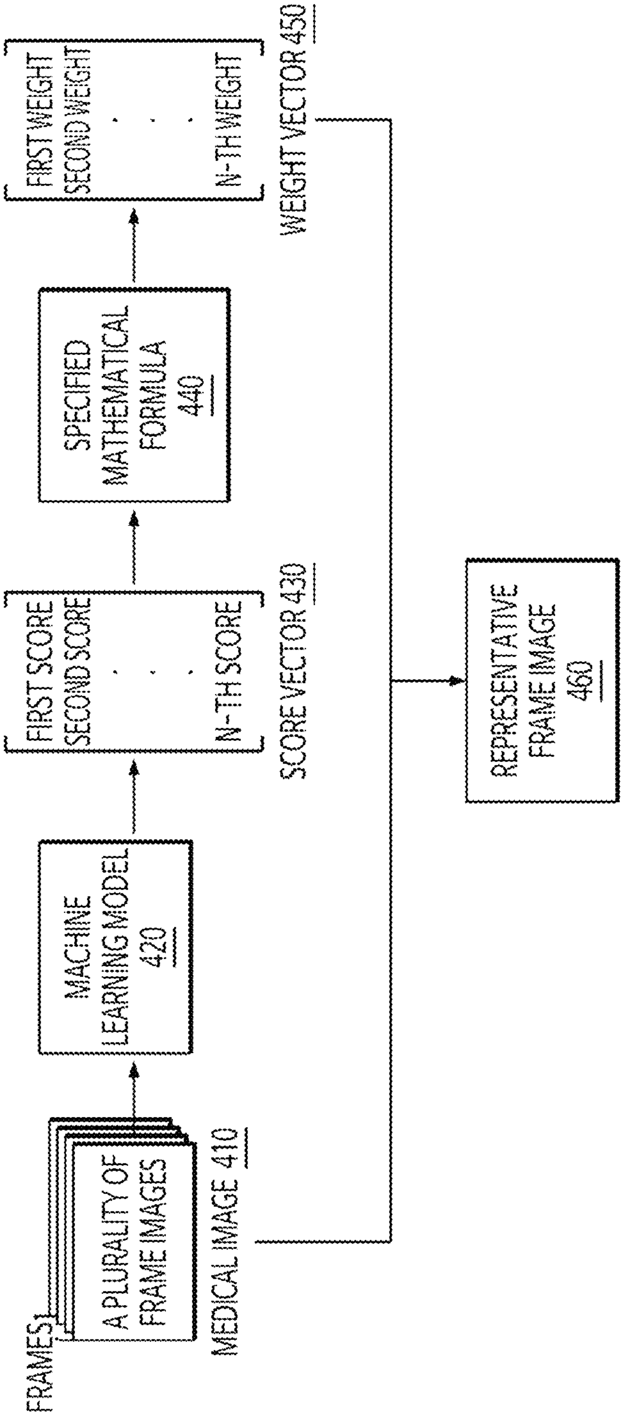
FIG. 4 is a diagram for explaining a method of generating a representative frame image of a medical image using a plurality of frame images included in the medical image according to an embodiment of the present disclosure.

FIG. 4 is a diagram for explaining a method of generating a representative frame image 460 of a medical image 410 using a plurality of frame images included in the medical image 410 according to an embodiment of the present disclosure. Referring to FIG. 4, the processor (e.g., the processor 220 in FIGS. 2 and 3) of an electronic device (e.g., the electronic device 100 in FIGS. 1 and 2) for generating the representative frame image 460 of the medical image 410 may calculate scores for each of the plurality of frame images included in the medical image 410. In the following description, the medical image 410 may be described as including n (where n is a positive integer) frame images. According to one embodiment, the processor may obtain a score vector 430 consisting of n score elements from the n frame images included in the medical image 410 through a machine learning model 420. Here, each score element included in the score vector 430 may represent the score of a corresponding frame image, and the score of a frame image may indicate an evaluation score representing how suitable the corresponding frame image is for analysis related to the diagnosis, treatment, or prevention of diseases in the medical image 410. Although the machine learning model 420 disclosed in FIG. 4 is described as a score calculation model for calculating scores for each of the plurality of frame images, it is not limited thereto. The machine learning model 420 according to one embodiment of the present disclosure may include a weight calculation model, a blood vessel region masking model, a blood vessel classification model, and others.

According to one embodiment, in relation to obtaining the score vector 430, the processor may calculate n score elements corresponding to each of the n frame images based on at least one of a value measuring the similarity between each of the n frame images and other frame images or a value measuring the image quality of each of the n frame images. For example, the processor may calculate the similarity between pixels included in each frame image based on at least one of the color values or luminance values of the pixels. The processor may then calculate the similarity between frame images based on the similarity between the pixels included in each frame image. Additionally, the processor may assign a high score to frame images with high similarity to other frame images. As another example, the processor may calculate the image quality of each frame image and assign a high score to frame images with good image quality. Here, the image quality may be calculated based on at least one of sharpness, brightness distortion, or contrast distortion. In yet another example, the processor may calculate n score elements corresponding to each of the n frame images by combining the value measuring the similarity between each of the n frame images and other frame images with the value measuring the image quality of each of the n frame images.

According to one embodiment, in relation to obtaining the score vector 430, the processor may calculate n score elements corresponding to each of the n frame images based on the size of a region within the blood vessel region (or region corresponding to the blood vessel) in each of the n frame images that satisfies specified conditions. For example, the processor may identify the region corresponding to the blood vessel in each of the n frame images, identify the region corresponding to the blood vessel that satisfies the specified conditions, and calculate n score elements corresponding to each of the n frame images based on the size of the region that satisfies the specified conditions. Here, the specified conditions may include conditions where the intensity of the color of pixels within the region exceeds a specified threshold. For instance, a medical image 410 capturing a blood vessel may be taken while a contrast agent is administered to the target patient to make the target blood vessel distinctly distinguishable from its surroundings, and the blood vessel region filled with the contrast agent may appear darker (or blacker) than the surroundings. Accordingly, the region within the blood vessel that satisfies the specified conditions may refer to a region where the intensity of the color of pixels within the corresponding region exceeds the specified threshold. The larger the size of the region within the blood vessel region that satisfies the specified conditions, the higher the score for the frame image may be.

According to one embodiment, in relation to obtaining the score vector 430, the processor may use the machine learning model 420 to mask regions determined to be blood vessels (blood vessel regions) in each of the n frame images included in the medical image 410 and calculate n score elements corresponding to each of the n frame images based on the masked regions. At this time, the score for a frame image may represent a score based on the intensity of the contrast agent calculable from the frame image. Here, the intensity of the contrast agent calculable from the frame image may include a value reflecting the degree to which the region corresponding to the blood vessel with the contrast agent injected is distinguishable from other regions in the frame image.

According to one embodiment, in relation to obtaining of the score vector 430, the processor may calculate reliability values for each of the plurality of pixels included in each of the n frame images in the medical image 410, indicating whether each pixel is determined to belong to a blood vessel region. Based on the calculated reliability values, the processor may calculate n score elements corresponding to each of the n frame images. For example, the processor may use a filter (e.g., a Frangi filter) to obtain reliability values indicating whether each of the plurality of pixels in a frame image is determined to belong to a blood vessel region. Here, the filter may include a filter that outputs reliability values indicating whether each pixel in the input image is determined to correspond to a tubular structure.

Next, the processor may obtain a weight vector 450 consisting of n weight elements from the score vector 430 using a specified mathematical formula 440. For example, the processor may input the n score elements included in the score vector 430 into the specified mathematical formula 440 and obtain the weight vector 450 consisting of n weight elements output by the specified mathematical formula 440. According to one embodiment, the specified mathematical formula may include functions such as a softmax function or a min-max normalization function, or a combination of two or more functions.

Next, the processor may generate a representative frame image 460 of the medical image 410 from the n frame images based on the scores for each of the n frame images. For example, the processor may apply the corresponding weight elements among n weight elements, obtained from the scores for each of the n frame images, to each of the n frame images. The processor may then merge the n frame images with the applied weight elements to generate the representative frame image 460. For instance, the processor may generate the representative frame image 460 by performing a weighted summation of the n frame images and their corresponding weight elements. Here, applying the weight elements corresponding to each of the n frame images may mean applying the corresponding weight elements to each of the pixels included in each frame image.

According to one embodiment, the processor may normalize the generated representative frame image 460. For example, the processor may normalize the representative frame image 460, generated through weighted summation, so that it has pixel values suitable for a model (e.g., a blood vessel classification model).

Figure 5:
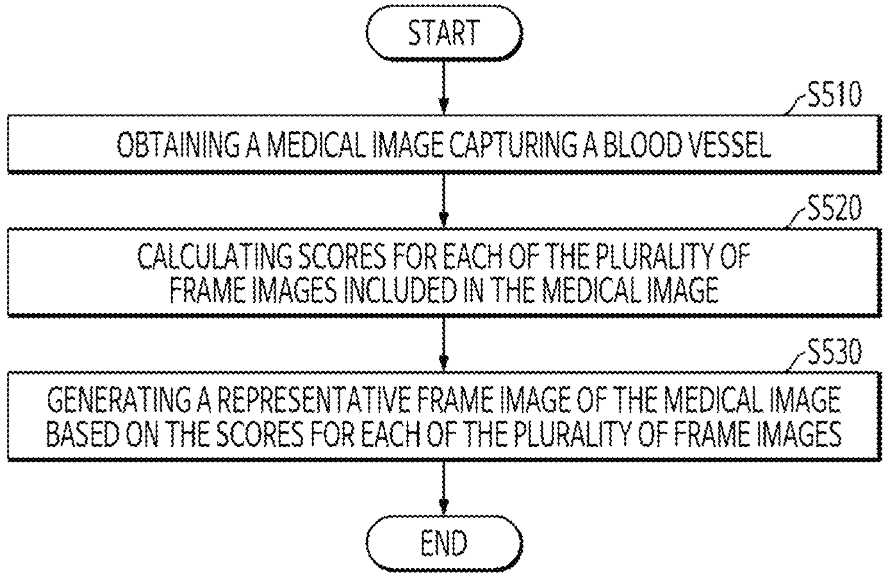
FIG. 5 is a diagram for explaining a method of generating a representative frame image of a medical image according to an embodiment of the present disclosure.

FIG. 5 is a diagram for explaining a method of generating a representative frame image of a medical image according to an embodiment of the present disclosure. Referring to FIG. 5, the processor (e.g., the processor 220 in FIGS. 2 and 3) of an electronic device (e.g., the electronic device 100 in FIGS. 1 and 2) for generating the representative frame image of a medical image may, in step 510 (S510), obtain a medical image capturing a blood vessel. Here, the medical image may include a medical image capturing the blood vessel of a target patient in a state where a contrast agent has been administered to the target patient. For example, the processor may receive the medical image from an external electronic device connected via a communication module (e.g., communication module 230 in FIG. 2). Here, the external electronic device may include a storage system (e.g., hospital systems, electronic medical records, prescription transmission systems, medical imaging systems, laboratory information systems, local/cloud storage systems) and/or a user terminal. As another example, the processor may receive the medical image from the memory of the electronic device (e.g., memory 210 in FIG. 2).

In step 520 (S520), the processor may calculate scores for each of the plurality of frame images included in the medical image. Here, the score for a frame image may represent an evaluation score indicating how suitable the corresponding frame image in the medical image is for analysis related to the diagnosis, treatment, or prevention of diseases.

According to one embodiment, the processor may, for each of the plurality of frame images, measure the similarity between each frame image and other frame images and calculate the scores for each of the plurality of frame images based on the measured values. For example, the processor may assign a high score to a frame image with high similarity to other frame images. The similarity between frame images may be calculated based on the similarity between pixels included in each frame image. The similarity between pixels may be calculated using at least one of the color values or luminance values of the pixels.

According to one embodiment, the processor may measure the image quality for each of the plurality of frame images and calculate scores for each of the plurality of frame images based on the measured values. For example, the processor may assign a high score to frame images with good image quality. The image quality of such frame images may be calculated based on factors such as sharpness, brightness distortion, or contrast distortion.

According to one embodiment, the processor may calculate scores for each of the plurality of frame images based on a value measuring the similarity between each frame image and other frame images and a value measuring the image quality. For example, the processor may calculate scores for each of the plurality of frame images by combining the value measuring the similarity with other frame images and the value measuring the image quality for each of the plurality of frame images. In this case, the process of combining the measured values may involve applying the same or different weights to the measured values.

According to one embodiment, the processor may calculate scores for each of the plurality of frame images based on the size of a region within the blood vessel region (or the region corresponding to the blood vessel) included in each of the plurality of frame images that satisfies specified conditions. For example, a medical image capturing a blood vessel may be taken while a contrast agent is administered to the target patient, allowing the target blood vessel to be distinctly distinguishable from its surroundings. The contrast agent may increase the contrast of the image by artificially enhancing the difference in X-ray absorption. For instance, the blood vessel region filled with the contrast agent may appear darker (or blacker) than the surrounding areas. Accordingly, the region within the blood vessel that satisfies the specified conditions may refer to a region where the intensity of the color of pixels within that region exceeds a specified threshold. The larger the size of the region within the blood vessel that satisfies the specified conditions, the higher the score for the frame image may be. In other words, assigning a high score to a frame image in relation to the blood vessel region may indicate that the corresponding frame image was obtained in a state where the contrast agent was evenly and sufficiently filled in the target blood vessel, making the target blood vessel distinctly distinguishable from its surroundings in the frame image.

According to one embodiment, the processor may calculate scores for each of the plurality of frame images included in a medical image through a machine learning model that takes the medical image as input. For example, the processor may use the machine learning model to obtain scores for each of the plurality of frame images included in the medical image based on at least one of the similarity between the corresponding frame image and other frame images or the image quality of the corresponding frame image. As another example, the processor may use the machine learning model to obtain scores for each of the plurality of frame images included in the medical image based on the size of a region within the image that satisfies specified conditions in the blood vessel region.

According to one embodiment, the processor may use the machine learning model to mask regions determined to be blood vessels (blood vessel regions) in each of the plurality of frame images included in the medical image and calculate scores for each of the plurality of frame images included in the medical images based on the masked regions. At this time, the score for a frame image may include a score based on the intensity of the contrast agent calculable from the frame image. Here, the intensity of the contrast agent calculable from the frame image may include a value reflecting the degree to which the region corresponding to the blood vessel with the contrast agent injected is distinguishable from other regions in the frame image.

According to one embodiment, the processor may calculate reliability values for each of the plurality of pixels included in each of the plurality of frame images in the medical image, determining whether each pixel is determined to belong to a blood vessel region. Based on the calculated reliability values, the processor may calculate scores for each of the plurality of frame images included in the medical image. For example, the processor may use a filter (e.g., a Frangi filter) to obtain reliability values for each of the plurality of pixels included in a frame image, determining whether each pixel is determined to belong to a blood vessel region. Then, the processor may adjust the magnitude of the reliability values calculated for the entire medical image. For instance, the processor may adjust the reliability values to have a range between 0 and 1. Subsequently, the processor may sum the reliability values for each of the plurality of pixels determined to belong to a blood vessel region for each frame image and calculate a score for each frame image based on the summed values.

In step 530 (S530), the processor may generate a representative frame image of the medical image based on the scores for each of the plurality of frame images. According to one embodiment, the processor may obtain weights for each of the plurality of frame images included in the medical image based on the scores for each of the plurality of frame images. For example, the processor may apply the scores for each of the plurality of frame images included in the medical image to a specified mathematical formula to calculate weights for each frame image. According to one embodiment, the specified mathematical formula may include functions such as a softmax function or a min-max normalization function, or a combination of two or more functions. Next, the processor may apply the corresponding weights to each of the plurality of frame images included in the medical image and merge the plurality of weighted frame images to generate the representative frame image. For example, the processor may generate the representative frame image by performing a weighted summation of the plurality of frame images and their corresponding weights. Here, applying weights to a frame image may mean applying weights to each of the pixels included in the frame image.

Figure 6:
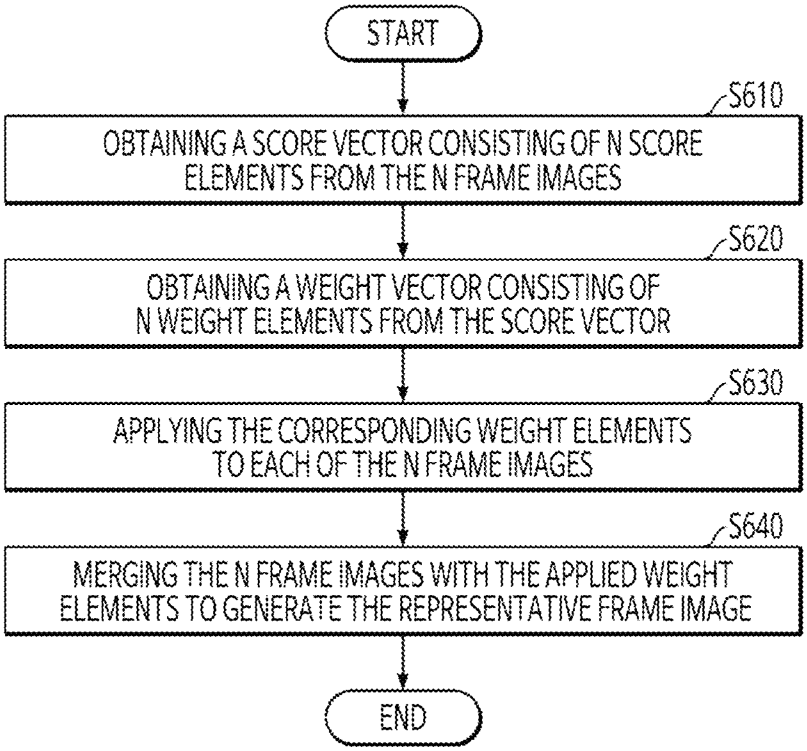
FIG. 6 is a diagram for explaining a method of generating a representative frame image of a medical image using a score vector and a weight vector according to an embodiment of the present disclosure.

FIG. 6 is a diagram for explaining a method of generating a representative frame image of a medical image using a score vector and a weight vector according to an embodiment of the present disclosure. Referring to FIG. 6, the processor (e.g., the processor 220 in FIGS. 2 and 3) of an electronic device (e.g., the electronic device 100 in FIGS. 1 and 2) for generating the representative frame image of a medical image may, in step 610 (S610), obtain a score vector consisting of n (where n is a positive integer) score elements from the n frame images included in the medical image. Here, each score element included in the score vector may represent the score of the corresponding frame image.

According to one embodiment, the processor may calculate n score elements corresponding to each of the n frame images based on at least one of a value measuring the similarity between each of the n frame images and other frame images or a value measuring the image quality of each of the n frame images. For example, the processor may calculate the similarity between pixels included in each frame image based on at least one of the color values or luminance values of the pixels included in each frame image. The processor may then calculate the similarity between frame images based on the similarity between the pixels included in each frame image. Additionally, the processor may assign a high score to frame images with high similarity to other frame images. As another example, the processor may calculate the image quality of each frame image and assign a high score to frame images with good image quality. Here, the image quality may be calculated based on at least one of sharpness, brightness distortion, or contrast distortion. In yet another example, the processor may calculate n score elements corresponding to each of the n frame images by combining the value measuring the similarity between each of the n frame images and other frame images and the value measuring the image quality of each of the n frame image.

According to one embodiment, the processor may calculate n score elements corresponding to each of the n frame images based on the size of a region within the blood vessel region (or the region corresponding to the blood vessel) included in each of n frame images that satisfies specified conditions. For example, the processor may identify the region corresponding to the blood vessel in each of the n frame images, identify the region within the blood vessel region that satisfies the specified conditions, and calculate n score elements corresponding to each of the n frame images based on the size of the region that satisfies the specified conditions. Here, the specified conditions may include conditions where the intensity of the color of pixels within the region exceeds a specified threshold. For instance, a medical image capturing a blood vessel may be taken while a contrast agent is administered to the target patient, allowing the target blood vessel to be distinctly distinguishable from its surroundings. The blood vessel region filled with the contrast agent may appear darker (or blacker) than the surroundings. Accordingly, the region within the blood vessel that satisfies the specified conditions may refer to a region where the intensity of the color of pixels within the corresponding region exceeds the specified threshold. The larger the size of the region within the blood vessel that satisfies the specified conditions, the higher the score for the frame image may be.

According to one embodiment, the processor may use a machine learning model to mask regions determined to be blood vessels (blood vessel regions) in each of the n frame images and calculate n score elements corresponding to each of the n frame images based on the masked regions. At this time, the score for a frame image may represent a score based on the intensity of the contrast agent calculable from the frame image. Here, the intensity of the contrast agent calculable from the frame image may include a value reflecting the degree to which the region corresponding to the blood vessel with the contrast agent injected is distinguishable from other regions in the frame image.

According to one embodiment, the processor may calculate reliability values for each of the plurality of pixels included in each of the n frame images, indicating how likely they are determined to belong to a blood vessel region, and calculate n score elements corresponding to each of the n frame images based on the calculated reliability values. For example, the processor may use a filter (e.g., a Frangi filter) to obtain reliability values for each of the plurality of pixels in a frame image, indicating how likely they are determined to correspond to a blood vessel region. Here, the filter may include a filter that outputs reliability values indicating how likely each of the plurality of pixels in the input image is determined to correspond to a vessel-like structure.

In step 620 (S620), the processor may obtain a weight vector consisting of n weight elements from the score vector. For example, the processor may input the n score elements included in the score vector into a specified mathematical formula and obtain a weight vector consisting of n weight elements output by the specified mathematical formula. According to one embodiment, the specified mathematical formula may include functions such as a softmax function or a min-max normalization function, or a combination of two or more functions.

In step 630 (S630), the processor may apply the corresponding weight elements to each of the n frame images. For example, the processor may apply the corresponding weight elements to each of the pixels included in each of the n frame images.

In step 640 (S640), the processor may merge the n frame images with the applied weight elements to generate the representative frame image. For example, the processor may generate the representative frame image by performing a weighted summation of the n frame images and their corresponding weight elements.

According to one embodiment, the processor may normalize the generated representative frame image. For example, the processor may normalize the representative frame image generated through weighted summation so that it has pixel values suitable for a model (e.g., a blood vessel classification model, segmentation model, catheter position detection model, or lesion information detection model).

Figure 7:
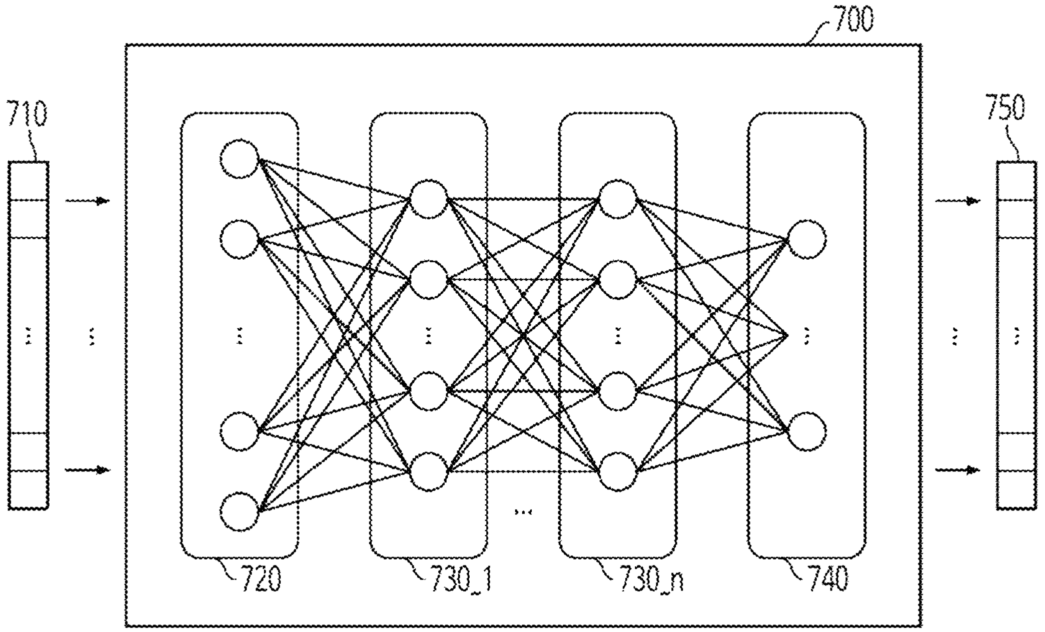
FIG. 7 is a diagram illustrating an artificial neural network model according to an embodiment of the present disclosure.

FIG. 7 is a diagram showing an artificial neural network model 700 according to an embodiment of the present disclosure. Referring to FIG. 7, the artificial neural network model 700, as an example of a machine learning model, may represent a statistical learning algorithm or a structure executing such an algorithm, implemented based on the structure of a biological neural network, in the fields of machine learning technology and cognitive science.

According to one embodiment, the artificial neural network model 700 may represent a machine learning model with problem-solving capabilities, which learns by repeatedly adjusting synaptic weights of nodes, which are artificial neurons that form a network through synaptic connections, similar to biological neural networks, to reduce the error between the correct output corresponding to a specific input and the inferred output. For example, the artificial neural network model 700 may include any probabilistic model, neural network model, or the like, used in artificial intelligence learning methods such as machine learning or deep learning.

According to one embodiment, the aforementioned score calculation model, weight calculation model, blood vessel region masking model, and/or blood vessel classification model may be implemented in the form of an artificial neural network model 700. For example, the artificial neural network model 700 may receive a medical image capturing a blood vessel and estimate a representative frame image of the medical image based on the received input.

The artificial neural network model 700 may be implemented as a multilayer perceptron (MLP) composed of multiple layers of nodes and connections between them. The artificial neural network model 700 in this embodiment may be implemented using one of the artificial neural network model structures that includes a multilayer perceptron. The artificial neural network model 700 may consist of an input layer 720 that receives input data 710 (or input signals) from an external source, an output layer 740 that outputs output data 750 (or output signals) corresponding to the input data 710, and n hidden layers 730_1 to **730_*n* (where n is a positive integer) positioned between the input layer 720 and the output layer 740. The hidden layers 730_1 to 730_*n* extract features from the signals received from the input layer 720 and pass them to the output layer 740. Here, the output layer 740 may receive signals from the hidden layers 730_1 to 730_*n*** and output them externally.

The training methods of the artificial neural network model 700 may include supervised learning methods, where the model is trained to optimize problem-solving based on the input of correct teacher signals (or labels), and unsupervised learning methods, which do not require teacher signals. According to one embodiment, the electronic device (e.g., the electronic device 100 in FIG. 1 and FIG. 2) in an embodiment of the present disclosure may train the artificial neural network model 700 using medical images capturing blood vessels.

According to one embodiment, the electronic device may generate training data for training the artificial neural network model 700. For example, the electronic device may generate a training dataset that includes medical images capturing blood vessels. Then, based on the generated training dataset, the electronic device may train the artificial neural network model 700 to generate representative frame images of medical images.

According to one embodiment, the input variables for the artificial neural network model 700 may include medical images capturing blood vessels. When the aforementioned input variables are input through the input layer 720, the output variables output by the output layer 740 of the artificial neural network model 700 may be representative frame images of the medical images.

In this way, multiple input variables corresponding to multiple output variables may be matched at the input layer 720 and the output layer 740 of the artificial neural network model 700. By adjusting the synaptic values between the nodes included in the input layer 720, the hidden layers 730_1 to **730_*n*, and the output layer 740, the model may be trained so that correct outputs corresponding to specific inputs are extracted. Through this training process, the characteristics hidden in the input variables of the artificial neural network model 700 may be identified. The synaptic values (or weights) between the nodes of the artificial neural network model 700 may be adjusted to reduce the error between the output variables calculated based on the input variables and the target output. Additionally, the electronic device may train an algorithm that receives medical images capturing blood vessels as input to minimize the loss with the representative frame images of the medical images (i.e., annotation information). Using the trained artificial neural network model 700**, the representative frame images of medical images may be estimated.

Figure 8:
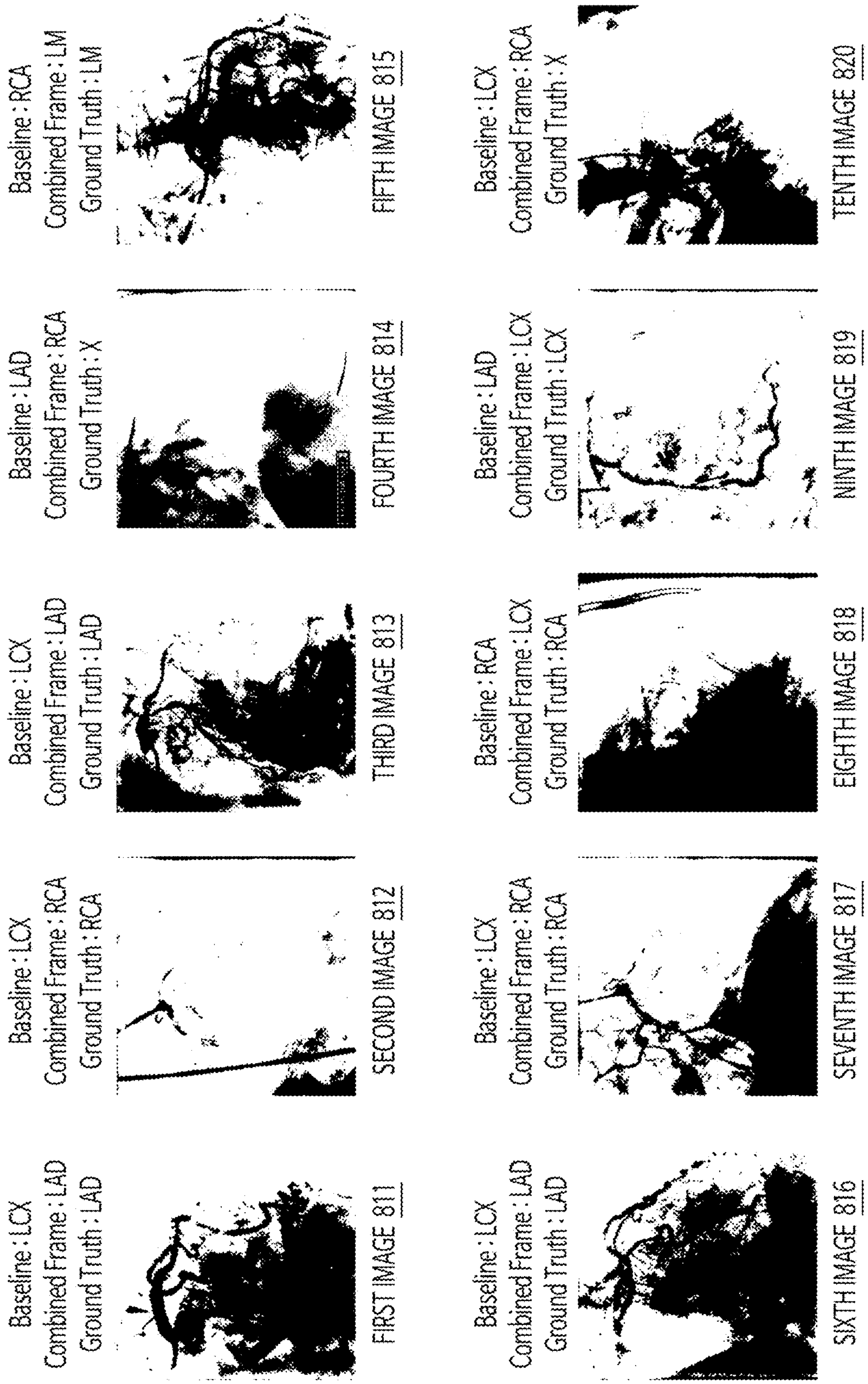
FIG. 8 is a diagram for explaining experimental results of applying the representative frame image of a medical image to a blood vessel classification model according to an embodiment of the present disclosure.

FIG. 8 is a diagram for explaining the experimental results of applying the representative frame image of a medical image to a blood vessel classification model according to an embodiment of the present disclosure. Referring to FIG. 8, the experiment compares how accurately the method of generating a representative frame image of a medical image and applying the generated representative frame image to the blood vessel classification model, according to an embodiment of the present disclosure, performs compared to the conventional method of selecting the most suitable frame image for a medical image and applying the selected frame image to the blood vessel classification model. For accuracy comparison, a total of 2176 medical images were used in the experiment, and the experimental results shown in FIG. 8 represent 10 medical images 811 to 820 that provided differing results.

Referring to FIG. 8, the experimental results are explained in detail as follows: Among the 10 medical images 811 to 820, the fourth image 814 and the tenth image 820 are medical images of the patient's blood vessels captured without the administration of a contrast agent to the target patient, making them cases where interpretation is not possible. The eighth image 818 represents a case in which the conventional method, where the most suitable frame image among the plurality of frame images included in the eighth image 818 was selected and applied to the blood vessel classification model, provided accurate results. In contrast, the remaining first image 811, second image 812, third image 813, fifth image 815, sixth image 816 seventh image 817, and ninth image 819 were processed using the method according to one embodiment of the present disclosure. Specifically, a representative frame image was generated using the plurality of frame images included in the medical images for example, the first image 811, second image 812, third image 813, fifth image 815, sixth image 816, seventh image 817, or ninth image 819, and the generated representative frame image was applied to the blood vessel classification model, which provided accurate results. In summary, the method according to one embodiment of the present disclosure achieved results matching the conventional method by 99.54%. Comparing the 10 medical images 811 to 820, which accounted for the 0.46% of unmatched results, it was confirmed that, excluding the two uninterpretable images, the method of the present disclosure demonstrated higher accuracy than the conventional method.

Figure 9:
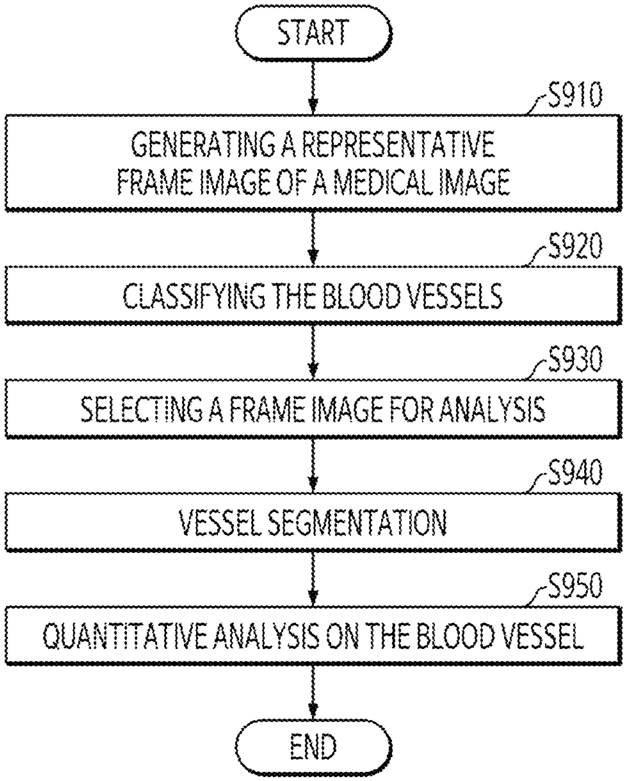
FIG. 9 is a diagram for explaining a method of analyzing a medical image according to an embodiment of the present disclosure.

FIG. 9 is a diagram for explaining a method of analyzing a medical image according to an embodiment of the present disclosure. Referring to FIG. 9, the processor (e.g., the processor 220 in FIGS. 2 and 3) of an electronic device (e.g., the electronic device 100 in FIGS. 1 and 2) may, in step 910 (S910), generate a representative frame image of a medical image. According to one embodiment, when the processor acquires a medical image including (or capturing) a blood vessel, it may calculate scores for each of the plurality of frame images included in the medical image and generate a representative frame image of the medical image from the plurality of frame images based on their scores for each of the plurality of frame images. The operations of the processor in step 910 may be identical or similar to the operations of the processor described with reference to FIG. 5.

In step 920 (S920), the processor may classify the blood vessels included in the medical image. For example, the processor may identify the type of blood vessels included in the medical image. Through step 920, the processor may identify which type of blood vessel is the target blood vessel for the medical image. According to one embodiment, the processor may classify the blood vessels included in the representative frame image of the medical image by applying the representative frame image of the medical image to a machine learning model (e.g., a blood vessel classification model).

In step 930 (S930), the processor may select a frame image for analysis from the medical image. According to one embodiment, the processor may select a frame image for analysis from among the plurality of frame images included in the medical image. Here, the frame image for analysis may, for example, represent a frame image suitable for analysis related to the diagnosis, treatment, or prevention of diseases. According to another embodiment, step 930 may be omitted. In this case, the processor may use the representative frame image of the medical image generated in step 910 as the frame image for analysis.

In step 940 (S940), the processor may perform vessel segmentation on the frame image selected for analysis. For example, the processor may divide (or distinguish) the blood vessel from the background in the frame image selected for analysis. According to one embodiment, the processor may apply the frame image selected for analysis to a machine learning model to divide the blood vessel region and the background region in the frame image. The machine learning model used in this process may be selected based on the type of blood vessel identified in step 920. For instance, if the identified type of blood vessel is the Left Main coronary artery (LM), the processor may divide the blood vessel region and the background region in the frame image selected for analysis using a Spider View segmentation model. As another example, if the identified type of blood vessel is the Left Circumflex coronary artery (LCX), Left Anterior Descending coronary artery (LAD), or Right Coronary Artery (RCA), the processor may divide the blood vessel region and the background region in the frame image selected for analysis using a general segmentation model. As described above, the processor may select a more appropriate machine learning model based on the type of blood vessel identified in step 920.

In step 950 (S950), the processor may perform quantitative analysis on the blood vessel. For example, the processor may detect lesions or calculate parameters such as the diameter of the blood vessel, the Fractional Flow Reserve (FFR) value, or a score related to cardiovascular health.

The flowchart and description above are merely examples and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method of generating a representative frame image of a medical image, performed by at least one processor, the method comprising:
- acquiring a medical image depicting an image of a blood vessel;
- determining a score for each of all frame images contained in the medical image by, for each frame image of the frame images:
  - masking, in the frame image, a region of the frame image corresponding to the blood vessel; and
  - determining, based on a quantity of pixels in the masked region, the score for the frame image, wherein the score for the frame image comprises a score based on an intensity of a contrast agent calculable from the frame image, and the intensity of the contrast agent comprises a value reflecting a degree to which a region corresponding to the blood vessel injected with the contrast agent is distinguishable from the remaining region in the frame image; and
- generating a representative frame image of the medical image using all of the frame images,
- wherein the generating the representative frame image of the medical image comprises:
  - normalizing the score for each frame image contained in the medical image within a of zero to one;
  - determining a weight for each frame image contained in the medical image by raising the normalized score to the power of m, with m being an integer greater than or equal to two, such that the weight for a lower score is suppressed toward zero while only the weight for a highest score is one; and
  - generating the representative frame image of the medical image by performing a weighted summation of all of the frame images using the weight for each frame image.

2. The method of claim 1, wherein the determining the score for each of all frame images comprises:
- acquiring a score vector composed of n score elements from n frame images through a machine learning model, wherein the medical image comprises the n frame images, and n is a positive integer greater than one.

3. The method of claim 2, wherein the determining the score for each of all frame images comprises:
- determining the n score elements each corresponding to one of the n frame images based on at least one of:
- a similarity between each of the n frame images and other frame images, or
- an image quality of each of the n frame images.

4. The method of claim 2, wherein the determining the score for each of all frame images comprises:
- identifying a region corresponding to the blood vessel in each of the n frame images;
- identifying a region, within the region corresponding to the blood vessel, that satisfies a specified condition; and
- determining the n score elements each corresponding to one of the n frame images based on a size of the region that satisfies the specified condition.

5. The method of claim 4, wherein the specified condition comprises:
- a condition in which an intensity of a color of pixels within the region that satisfies the specified condition is greater than or equal to a specified threshold.

6. The method of claim 1, wherein the generating the representative frame image of the medical image comprises:
- acquiring a score vector composed of n score elements from n frame images through a machine learning model; and
- acquiring a weight vector consisting of n weight elements from the score vector using a specified formula.

7. The method of claim 6, wherein the generating the representative frame image of the medical image comprises:
- applying corresponding weight elements among the n weight elements included in the weight vector to each of the n frame images; and
- merging the n frame images with the corresponding weight elements applied to generate the representative frame image.

8. The method of claim 7, wherein the applying the corresponding weight elements to each of the n frame images comprises:
- applying the corresponding weight elements to each of pixels comprised in each of the n frame images.

9. The method of claim 1, wherein the determining the score for each of all frame images further comprises:

determining the score for each of all frame images based on a value measuring similarity between each of all frame images and other frame images.

10. The method of claim 1, wherein the determining the score for each of all frame images further comprises:

determining the score for each of all frame images based on a value measuring an image quality of each of all frame images.

11. The method of claim 1, wherein the determining the score for each of all frame images further comprises:

identifying a region corresponding to the blood vessel in each of all frame images;

identifying a region within the region corresponding to the blood vessel that satisfies a specified condition; and determining the score for each of all frame images based on a size of the region that satisfies the specified condition.

12. The method of claim 1, wherein the masking, in the frame image, the region of the frame image corresponding to the blood vessel is based on a color of pixels within the region.

13. A non-transitory computer-readable recording medium storing computer-readable instructions, wherein the instructions, when executed by at least one processor, cause an electronic device to:

acquire a medical image depicting an image of a blood vessel;

determine a score for each of all frame images contained in the medical image by, for each frame image of the frame images:

masking, in the frame image, a region of the frame image corresponding to the blood vessel; and determining, based on a quantity of pixels in the masked region, the score for the frame image, wherein the score for the frame image comprises a score based on an intensity of a contrast agent calculable from the frame image, and the intensity of the contrast agent comprises a value reflecting a degree to which a region corresponding to the blood vessel injected with the contrast agent is distinguishable from the remaining region in the frame image; and generate a representative frame image of the medical image using all of the frame images, wherein the instructions, when executed by the at least one processor, cause the electronic device to generate the representative frame image of the medical image by causing the electronic device to:

normalize the score for each frame image contained in the medical image within a range of zero to one;

determine a weight for each frame image contained in the medical image by raising the normalized score to the power of m, with m being an integer greater than or equal to two, such that the weight for a lower score is suppressed toward zero while only the weight for a highest score is one; and generate the representative frame image of the medical image by performing a weighted summation of all of the frame images using the weight for each frame image.

14. An electronic device comprising:

at least one processor; and memory storing instructions that, when executed by the at least one processor, cause the electronic device to:

acquire a medical image depicting an image of a blood vessel;

determine a score for each of all frame images contained in the medical image by, for each frame image of the frame images:

masking, in the frame image, a region of the frame image corresponding to the blood vessel; and determining, based on a quantity of pixels in the masked region, the score for the frame image, wherein the score for the frame image comprises a score based on an intensity of a contrast agent calculable from the frame image, and the intensity of the contrast agent comprises a value reflecting a degree to which a region corresponding to the blood vessel injected with the contrast agent is distinguishable from the remaining region in the frame image; and generate a representative frame image of the medical image using all of the frame images, wherein the instructions, when executed by the at least one processor, cause the electronic device to generate the representative frame image of the medical image by causing the electronic device to:

normalize the score for each frame image contained in the medical image within a range of zero to one;

determine a weight for each frame image contained in the medical image by raising the normalized score to the power of m with m being an integer greater than or equal to two, such that the weight for a lower score is suppressed toward zero while only the weight for a highest score is one; and generate the representative frame image of the medical image by performing a weighted summation of all of the frame images using the weight for each frame image.

15. The non-transitory computer-readable recording medium of claim 13, wherein the instructions, when executed by the at least one processor, cause the electronic device to determine the score for each of all frame images by causing the electronic device to:

determine, using a machine learning model, the score for each of all frame images.

16. The non-transitory computer-readable recording medium of claim 13, wherein the instructions, when executed by the at least one processor, cause the electronic device to determine the score for each of all frame images based on at least one of:

a similarity between the frame image and other frame images, or an image quality of the frame image.

17. The non-transitory computer-readable recording medium of claim 13, wherein the instructions, when executed by the at least one processor, cause the electronic device to determine the score for each of all frame images based on a size of the masked region.

18. The electronic device of claim 14, wherein the instructions, when executed by the at least one processor, cause the electronic device to determine the score for each of all frame images by causing the electronic device to:

determine, using a machine learning model, the score for each of all frame images.

19. The electronic device of claim 14, wherein the instructions, when executed by the at least one processor, cause the electronic device to determine the score for each of all frame images based on at least one of:

a similarity between the frame image and other frame images, or an image quality of the frame image.

* * * * *